(12) United States Patent
Rasheed

(10) Patent No.: US 12,412,363 B2
(45) Date of Patent: Sep. 9, 2025

(54) METHOD AND DEVICE FOR SENSING THE ENVIRONMENT OF A VEHICLE DRIVING WITH AT LEAST SEMI-AUTOMATION

(71) Applicant: Volkswagen Aktiengesellschaft, Wolfsburg (DE)

(72) Inventor: Umair Rasheed, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 357 days.

(21) Appl. No.: 18/023,683

(22) PCT Filed: Jul. 6, 2021

(86) PCT No.: PCT/EP2021/068720
§ 371 (c)(1),
(2) Date: Feb. 27, 2023

(87) PCT Pub. No.: WO2022/048811
PCT Pub. Date: Mar. 10, 2022

(65) Prior Publication Data
US 2024/0029389 A1    Jan. 25, 2024

(30) Foreign Application Priority Data
Sep. 1, 2020    (DE) .......................... 102020211023.9

(51) Int. Cl.
*G06V 10/25*    (2022.01)
*G06V 20/56*    (2022.01)

(52) U.S. Cl.
CPC .............. *G06V 10/25* (2022.01); *G06V 20/56* (2022.01)

(58) Field of Classification Search
CPC .............................. G06V 10/25; G06V 20/56
See application file for complete search history.

(56) References Cited

U.S. PATENT DOCUMENTS

| | | |
|---|---|---|
| 6,324,532 B1 | 11/2001 | Spence et al. |
| 9,275,308 B2 | 3/2016 | Szegedy et al. |
| 9,511,767 B1 | 12/2016 | Okumura et al. |

(Continued)

FOREIGN PATENT DOCUMENTS

| | | |
|---|---|---|
| DE | 102016213494 A1 | 1/2018 |
| WO | 2019101720 A | 5/2019 |

OTHER PUBLICATIONS

PCT/EP2021/068720. International Search Report (Oct. 25, 2021).

(Continued)

*Primary Examiner* — Casey L Kretzer
(74) *Attorney, Agent, or Firm* — Peter Zura; LOZA & LOZA, LLP

(57) ABSTRACT

Technologies and techniques for sensing the environment of a vehicle driving with at least semi-automation. The environment of the vehicle is captured via at least one sensor, wherein sensor data captured by the at least one sensor are evaluated by an evaluation device via at least one evaluation method in a first resolution. The captured sensor data in at least one defined focus region are evaluated by the evaluation device via the at least one evaluation method in a second resolution, the first resolution being lower than the second resolution. The evaluation results are combined and output. Aspects also relate to a device for sensing the environment of a vehicle driving with at least semi-automation.

20 Claims, 4 Drawing Sheets

(56) References Cited

U.S. PATENT DOCUMENTS

| | | | |
|---|---|---|---|
| 9,549,125 B1* | 1/2017 | Goyal | H04N 23/80 |
| 9,983,591 B2 | 5/2018 | Micks et al. | |
| 10,452,068 B2 | 10/2019 | Djuric et al. | |
| 10,467,503 B1 | 11/2019 | Kim et al. | |
| 10,742,907 B2 | 8/2020 | Dreier et al. | |
| 2018/0129881 A1* | 5/2018 | Seeber | G08G 5/59 |
| 2018/0306905 A1* | 10/2018 | Kapusta | G01S 7/4808 |
| 2019/0391578 A1* | 12/2019 | Tariq | G06N 7/01 |
| 2023/0245414 A1* | 8/2023 | Lewin | G06V 20/56 |
| | | | 382/100 |

OTHER PUBLICATIONS

Priority Appln. No. DE102020211023.9. Office Action (Apr. 30, 2021).

Luusua. "Vehicle detection, at a distance—done efficiently via fusion of short and long range images." Master's Thesis, Linkoping University, Computer Science & Engineering. Linköping, Sweden (2020).

Mattela et al. "An Efficient Pipeline for Distant Person Detection and Identification in 4K Video using GPUs." 2020 International Conference on COMmunication Systems & NETworkS (COMSNETS), Bengaluru, India pp. 744-749 (2020).

Ruzicka et al. "Fast and accurate object detection in high resolution 4K and 8K video using GPUs." 2018 IEEE High Performance extreme Computing Conference (HPEC), Waltham, MA, USA, pp. 1-7 (2018).

* cited by examiner

METHOD AND DEVICE FOR SENSING THE ENVIRONMENT OF A VEHICLE DRIVING WITH AT LEAST SEMI-AUTOMATION

RELATED APPLICATIONS

The present application claims priority to international Patent Application No. PCT/EP2021/068720 to Umair Rasheed, titled "Method And Device For Sensing The Environment Of A Vehicle Driving With At Least Semi-Automation", filed Jul. 6, 2021, which claims priority to German Patent App. No. DE 10 2020 211 023.9, filed Sep. 1, 2020, the contents of each being incorporated by reference in their entirety herein.

BACKGROUND

The present disclosure relates to a method and to device for sensing an environment of a vehicle driving in an at least semi-automated manner.

Robust and precise sensing of the environment is indispensable for the automated driving of vehicles. Artificial neural networks form the backbone during the sensing of the environment. The sensors that are used to capture an environment of the vehicle are predominantly cameras since these provide high information density, while being available relatively inexpensively. A computing power in vehicles driving in an automated manner is generally limited. As a result, methods for sensing the environment must get by with this limited computing power. At the same time, however, the method should be real-time capable and be sufficiently accurate to also allow emergency situations to be handled successfully.

SUMMARY

Aspects of the present disclosure are to improve a method and a device for sensing an environment of a vehicle driving in an at least semi-automated manner, in particular with respect to a required computing power and with respect to accuracy.

SUMMARY

Some aspects are achieved according to independent claims recited below. Other advantageous embodiments of the present disclosure will be apparent from the dependent claims.

In some examples, a method is disclosed for sensing an environment of a vehicle driving in an at least semi-automated manner is provided, wherein an environment of the vehicle is captured using at least one sensor, wherein sensor data captured by the at least one sensor are evaluated via an evaluation unit using at least one evaluation method in a first resolution, and wherein the captured sensor data in at least one defined focus region are evaluated via the evaluation unit using the at least one evaluation method in a second resolution, the first resolution being lower than the second resolution, and wherein the evaluation results are combined and output.

In some examples, a device is disclosed for sensing an environment of a vehicle driving in an at least semi-automated manner, comprising an evaluation unit, wherein the evaluation unit is configured to evaluate sensor data, captured by at least one sensor, using at least one evaluation method in a first resolution, and to evaluate the captured sensor data using the at least one evaluation method in at least one defined focus region in a second resolution, the first resolution being lower than the second resolution, and to combine and output the evaluation results.

Further features and aspects regarding configurations of the device will be apparent from the description of designs of the method. The advantages of the device are in each case the same as with the designs of the method.

In addition, a vehicle is also disclosed, comprising at least one device according to any of the described embodiments.

BRIEF DESCRIPTION OF THE DRAWINGS

Aspects of the present disclosure will be described in more detail hereafter based on preferred exemplary embodiments with reference to the figures. In the drawings.

DETAILED DESCRIPTION

Figure 1:
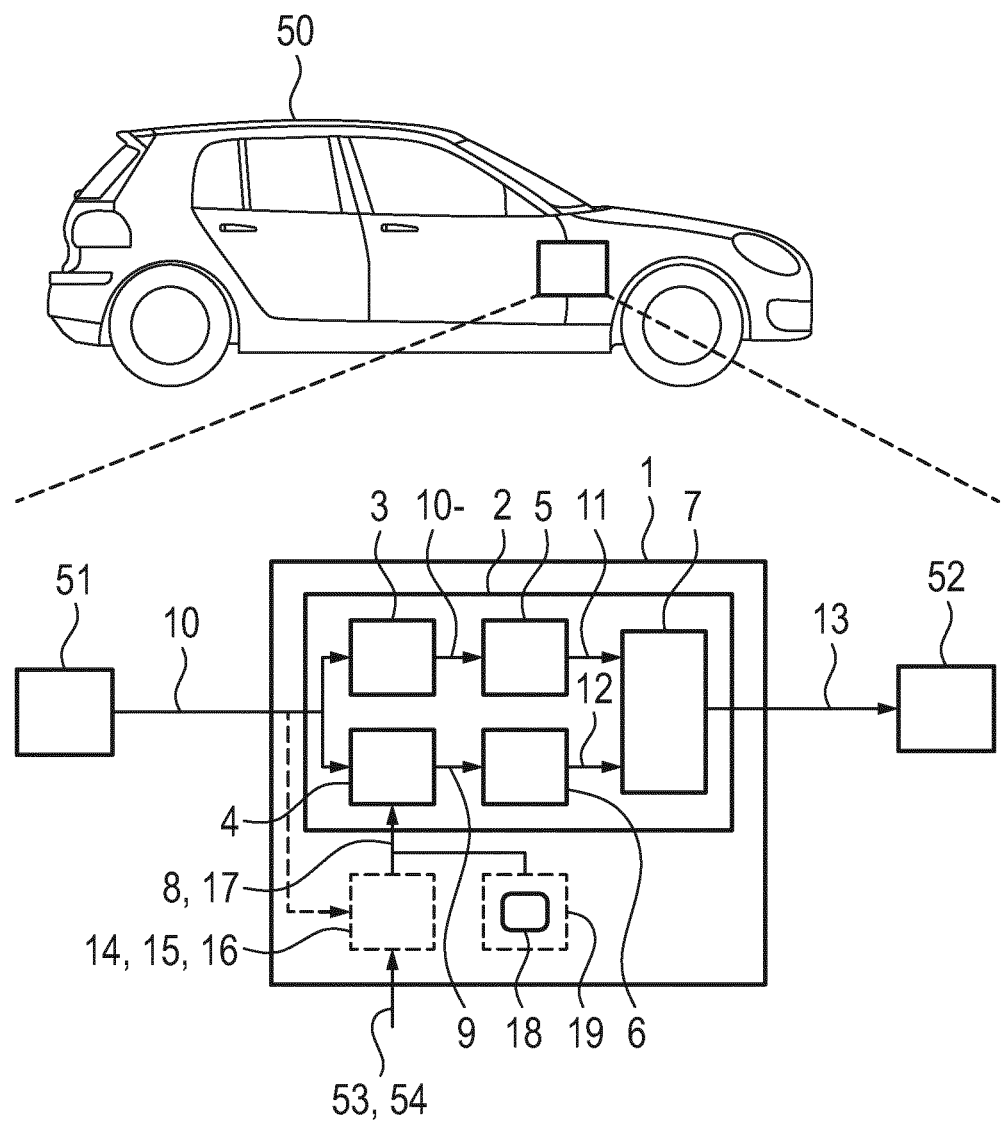
FIG. 1 shows a schematic representation of a device for sensing an environment of a vehicle driving in an at least semi-automated manner according to some aspects of the present disclosure.

In some examples, aspects of the methods and the devices disclosed herein illustrate a compromise between computing power that is required during the evaluation of captured sensor data and an accuracy of the evaluation. The sensor data may be evaluated in a first resolution, which is lower than the original resolution. At least one focus region may be defined in the captured sensor data, representing a reduction in scope of the sensor data, compared to the original sensor data. For example, a section in a two-dimensional camera image can form such a focus region. In the at least one focus region, the sensor data are evaluated with a second resolution. The first resolution is lower than the second resolution. The second resolution corresponds to the original (full) resolution of the captured sensor data. Since the captured sensor data overall are evaluated with a resolution that is lower than the original resolution, and only the at least one focus region is evaluated with a higher, fuller, resolution, an overall computing power that is required for the evaluation can be reduced, while achieving a sufficiently high accuracy in the at least one focus region during the evaluation.

In some examples, a sensor may be configured as a camera, which captures an environment of the vehicle. In other examples, a sensor may also be a LIDAR sensor, a radar sensor or an ultrasonic sensor.

The captured sensor data can be one-dimensional or multi-dimensional. In some examples discussed herein, the captured sensor data is two-dimensional, and include captured camera images. In other examples, the captured sensor data may also be point clouds of a LIDAR sensor, or of a radar sensor or ultrasonic data.

An evaluation method may be configured for sensing the environment and/or interpreting the environment in which at least one sensing function is carried out. For example, such a sensing function can be one of the following: an object recognition, a determination of bounding boxes, a semantic segmentation, an instance segmentation or a panoptic segmentation, and the like.

In some examples, the evaluation method may be carried out using machine learning and configured for (trained) neural networks. For example, it may be provided that a first trained neural network is provided by the evaluation unit, which processes the captured sensor data in the lower first resolution and carries out one or more of the aforementioned evaluation methods. A second trained neural network, which is provided by the evaluation unit, evaluates the captured sensor data in the at least one focus region in the higher, in particular in the original, second resolution.

In some examples, the evaluation method can also be provided and/or carried out in another manner and/or by other means, that is, it is also possible to employ traditional methods of sensor data evaluation.

In some examples, the captured sensor data are down-sampled to the first resolution. This may be carried out using methods that are known per se. In the case of camera images serving as the captured sensor data, for example, the number of picture elements (pixels) is decreased so that the image is down-sampled to a lower total picture element count. For the at least one focus region, the captured sensor data were correspondingly trimmed to a section, so that only the sensor data within the section of the at least one focus region can be supplied as input data to the evaluation method, for example the second neural network. It may be provided that the second neural network is re-instantiated or separately provided and executed for each defined focus region.

Parts of the device, such as the evaluation unit and the integral components thereof, can, individually or together, be designed as a combination of hardware and software, for example as program code that is executed on a microcontroller or microprocessor. However, it may also be provided that parts, individually or together, are designed as an application-specific integrated circuit (ASIC).

A vehicle as disclosed herein may be configured as a motor vehicle. However, a vehicle may also be configured as another land vehicle, a rail vehicle, a watercraft, an aircraft or a space craft.

In some examples, at least one focus region may be defined using a rule-based system as a function of a position of the vehicle and/or a planned trajectory of the vehicle and/or an environment context. In this way, the at least one focus region can be deliberately directed at particularly relevant areas in the environment of the vehicle. For example, it may be provided that, as a function of the position in a map of the environment, particularly relevant areas in the environment are marked or stored. For example, it may be stored in the environment map that a school is located in the vicinity of the current position of the vehicle.

Proceeding from this information, a focus region can be defined, for example, so as to capture a side of the road and a sidewalk in front of the school. Further examples of areas that can be considered more closely during the evaluation by means of a focus region are: a crosswalk, junctions of secondary roads or entrances, oncoming traffic, and the like. If a planned trajectory is known, a focus region can also be defined as a function of the planned trajectory. For example, it may be provided that the planned trajectory provides for a left turn of the vehicle, including cutting across oncoming traffic.

Proceeding from the planned trajectory, a focus region can then be placed onto the opposite traffic lane so as to sense approaching vehicles there in an improved manner, that is, with a higher resolution. An environment context can be derived both from captured sensor data and from an environment map, especially to better sense, for example in the case of a play street, the areas on the play street and the edge areas by way of defined focus regions. In some examples, linkages are stored in the rule-based system, which link a position of the vehicle and/or a planned trajectory or a type or class of the planned trajectory (left turn, right turn, passing, and the like) and/or an environment context with at least one focus region. The at least one focus region can, for example, have been or be defined by way of position information relative to the vehicle and/or with respect to the captured sensor data. For example, a focus region can be defined by specifying picture element areas in captured camera images.

In the rule-based system, for example, it may be provided, as a starting linkage, that a focus region covers an area around the center of road situated ahead. Depending on the specific environment, further focus regions can then be defined as a function of defined rules (for example, school ahead, crosswalk ahead, bicycle lane cutting across, and the like). The rule-based system can, for example, be provided by means of a logic module of the device which is configured for this purpose.

In some examples, temporal changes in the captured sensor data are detected, wherein at least one focus region is defined as a function of at least one detected temporal change in the captured sensor data. In this way, it is possible to define or newly create a focus region when any temporal change occurs in the environment. A temporal change means that, in the case of chronologically consecutively captured sensor data, for example consecutive camera images ("frames"), these differ from one another at least in sub-areas. For example, a depicted traffic light can switch from a green light to a red light in consecutive camera images. Since changes represent a potential hazard for the vehicle (or other road users that cause the change), and are therefore of greater interest during the sensing of the environment, it is possible in this way to dynamically define focus regions as a function of the environment or a change in the state of the environment.

In some examples, movements in the environment of the vehicle are detected in the captured sensor data, wherein at least one focus region is defined as a function of at least one detected movement in the captured sensor data. In this way, it is possible for sensor data that depict objects in the environment which are moving to be evaluated with a higher resolution. The idea behind this is also that moving objects in the environment, in contrast to static objects in the environment, are potentially more dangerous, and therefore require greater attention or greater accuracy during the evaluation. It may be provided that the at least one evaluation method supplies the information regarding movements of objects in the environment, for example by means of corresponding methods for recognizing the movement of objects.

In some examples, at least one focus region is defined by means of a machine learning method. It may be provided to train a neural network, so that this network estimates areas in which focus regions are to be defined as a function of the captured sensor data and/or a position of the vehicle and/or an environment context (for example, play street, highway, crosswalk, underground parking garage, and the like). In this way, it is also possible to estimate and define focus regions for unknown environments.

In some examples, an uncertainty of the evaluation results which is estimated using the evaluation method is taken into consideration during the combination of the evaluation results. In this way, the evaluation results can in each case be taken into consideration in a manner that is weighted with the estimated uncertainty. If, for example, camera images are evaluated as sensor data and if, for example, a picture element-wise assignment to objects is carried out (for example for multiple object classes), it is possible to specify for each picture element an uncertainty with which the assignment can be assessed. Such a picture element-wise assignment and associated specification of the uncertainty can take place by means of a neural network. The evaluation results available then are an assignment with associated uncertainties for the entire camera image in a lower first resolution, and an assignment with associated uncertainties for the (at least one) focus region in a second, higher resolution.

During combining, the assignments can be tallied, or added up, in a manner that is weighted according to the respective uncertainties. If neural networks are used, an assignment of the picture elements to objects (or object classes) in edge areas of the focus region is subject to greater uncertainty than in areas located further to the inside since less information is available at the edges (since information beyond the cut-off edges is lacking). During combining, a greater weight can be attached to the evaluation results of the evaluation in the first, lower resolution, in a manner that is weighted by way of the respective assigned uncertainties, so that an overall result as a whole in the edge areas of the focus region is improved.

In some examples, if multiple focus regions are defined, a priority is being assigned or is assigned to each of the focus regions, wherein, during the evaluation of the respective associated sensor data, the focus regions are processed in the order of the assigned priorities. The priority can, for example, be assigned as a function of an object class that is assigned to an object within the scope of the environment sensing process. In this way, for example, a vulnerability of other road users can be prioritized, wherein pedestrians and bicyclists are given a higher priority compared to other vehicles. For example, it may also be provided that children are given a higher priority than adult persons since a behavior of children is generally less predictable than a behavior of adult persons. In this way, it is possible to focus limited available computing power on the focus regions having the highest priorities.

In some examples, when abandoning a focus region, an evaluation result is maintained at least for a predefined duration in the second resolution. In this way, the evaluation results generated for the higher second resolution can continue to be used at least in the predefined time period, and thus enhance accuracy, despite this focus region being abandoned in terms of the sensing of the environment. Abandoning a focus region shall mean, in particular, that the sensor data in the abandoned focus region are not further evaluated in the second higher resolution, but only in the first lower resolution. The predefined duration can, in particular, be several hundred milliseconds to seconds.

FIG. 1 shows a schematic representation of an embodiment of the device 1 for sensing an environment of a vehicle 50 driving in an at least semi-automated manner. The device 1 carries out the method described in the present disclosure for sensing an environment of a vehicle 50 driving in an at least semi-automated manner.

The device 1 may include an evaluation unit 2. The evaluation unit 2 may include a resolution reduction module 3, a cut-out module 4, a first neural network 5, a second neural network 6 and a combining module 7. Parts of the device 1, such as the evaluation unit 2 and the integral components thereof, can, individually or together, be designed as a combination of hardware and software, for example as program code that is executed on a microcontroller or microprocessor.

Captured sensor data 10 of at least one sensor 51 of the vehicle 50 are supplied to the device 1. The sensor 51 is in particular a camera, and the sensor data 10 are in particular camera images captured of the environment.

A resolution of the captured sensor data 10, that include captured camera images, is decreased by the resolution reduction module 3 to a first resolution, and resolution-reduced sensor data 10—are provided. In parallel thereto, the cut-out module 4 cuts a section 9 out of the captured sensor data 10, including the camera images, as a function of a defined focus region 8. A second resolution of the section 9 corresponds to a resolution of the original sensor data 10. The first resolution is thus lower than the second resolution.

The sensor data 10 in the first resolution are supplied to the first neural network 5. The section 9 in the second resolution is supplied to the second neural network 6. The first neural network 5 and the second neural network 6 carry out the same evaluation method, in particular a sensing function, for example a semantic segmentation, in which an object class is assigned in each case to the individual picture elements in the captured camera images, that is, it is estimated for each picture element which object the picture element depicts in each case. Evaluation results 11, 12 are output by the neural networks 5, 6 and supplied to the combining module 7.

Even though the procedure is described based on neural networks 5, 6, it is also possible to use other methods of machine learning or of traditional sensor data evaluation so as to evaluate the sensor data 10 in the first resolution and the section 9, associated with the focus region 8, from the sensor data 10 in the second resolution. However, it is noted here that the evaluation method, that is, the sensing function for sensing the environment or interpreting the environment (such as object recognition, semantic segmentation, semantic instance segmentation, bounding boxes, and the like) is the same for both options.

The combining module 7 combines the evaluation results 11, 12 to form an overall result 13. In the case of camera images, the evaluation result 11 is, for example, up-sampled for this purpose to the original resolution (which corresponds to the second resolution) again, and the evaluation result 12 for the section 9 is inserted into the up-sampled evaluation result 11 in a picture element-wise manner at the correct position. It may in particular be provided that a mean value of the evaluation results 11, 12 is calculated.

During the combining of the evaluation results 11, 12, it may be provided that an uncertainty of the evaluation results 11, 12 which is estimated using the evaluation method is taken into consideration. The neural networks 11, 12 estimate the evaluation results 11, 12, for example in the form of object classes that are in each case assigned to individual picture elements, while additionally supplying a respective uncertainty for the picture element-wise estimations at the same time. A weighting factor during the combining can be defined or have been defined by way of the respective estimated uncertainty. In particular in the case of edges of the section 9 in which estimations of the second neural network 6, due to lacking additional information of areas beyond the edge, have a greater uncertainty, the overall result 13 can thus be improved, since in these areas the evaluation result 11 of the first neural network 5 can be taken into consideration with a greater weighting.

It may be provided that at least one focus region 8 is defined by means of a rule-based system 18 as a function of a position 53 of the vehicle 50 and/or a planned trajectory 54 of the vehicle 50 and/or an environment context. So as to provide the rule-based system 18, the device 1 can comprise a logic module 19, for example, in which the rule-based system 18 is kept available and applied. For example, it is possible to look up, as a function of the position 53 of the vehicle 50 in a road map and/or environment map, which focus regions 8 in the environment are stored. As a function of the planned trajectory 54, it is possible, for example, to place a focus region 8 onto the oncoming traffic (for example, when turning, with cutting across an opposite traffic lane). An environment context can, for example, relate to a play street, a residential area that includes families who have small children, or a game crossing, and the like, wherein focus regions 8 are then, for example, defined as areas in the vicinity of vehicles parked at the edge of the play street, as the oncoming traffic or as the roadside adjoining woods. The position 53 and the planned trajectory 54 are supplied to the logic module 19, for example, by a navigation system and/or a vehicle control unit (not shown) of the vehicle 50.

It may be provided that temporal changes in the captured sensor data 10 are detected, wherein at least one focus region 8 is defined as a function of at least one detected temporal change in the captured sensor data 10. For this purpose, the device 1 can comprise a change detection module 14, for example, by way of which areas in the captured sensor data 10 are detected in which a change (for example, a change of a traffic light phase or a flashing of a turn signal of another vehicle, and the like) is detected.

In some examples, movements in the environment of the vehicle 50 are detected in the captured sensor data 10, wherein at least one focus region 8 is defined as a function of at least one detected movement in the captured sensor data 10. For this purpose, the device 1 can comprise a movement detection module 15, for example, which recognizes movements in the captured sensor data 10, in particular captured camera images, and defines an associated area, in particular a picture element area in at least one camera image, as a focus region 8.

In some examples, at least one focus region 8 may be defined via a machine learning method. For example, for this purpose, a further neural network 16 may be trained to estimate and define focus regions 8 as a function of captured sensor data 10, in particular captured camera images, and/or other information (an environment context and/or a position 53 of the vehicle 50, and the like).

If multiple focus regions 8 are defined, a priority 17 may be assigned to each of the focus regions 8, wherein, during the evaluation of the respective associated sensor data 10, the focus regions 8 are processed in the order of the assigned priorities 17. The priorities 17 can, for example, be selected as a function of a vulnerability of another road user encompassed by the focus region 8. For this purpose, a prioritization module (not shown) of the device 1 can be provided, for example.

In some examples, when a focus region 8 is being abandoned, an evaluation result 12 is maintained at least for a predefined duration in the second resolution. This takes place, for example, in the combining module 7.

The device 1 makes it possible to find an advantageous compromise, when carrying out the evaluation methods, with respect to a required computing power and an accuracy. Even though a computing power can be reduced since the captured sensor data 10 can only be completely processed in a reduced resolution, relevant areas can be evaluated with a higher, in particular the original, resolution by defining focus regions 8.

The overall result 13 can, for example, be supplied to a maneuver planner 52 of the vehicle 50 and can be taken into consideration there when planning maneuvers for automated driving.

Figure 2A:
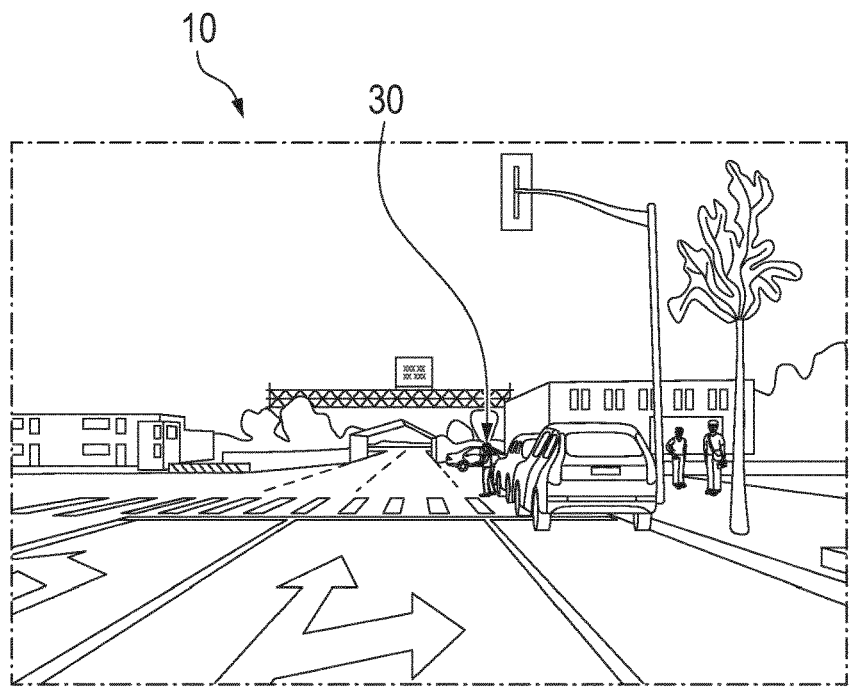
FIG. 2a shows a schematic representation to illustrate a method for capturing sensor data according to some aspects of the present disclosure.
Figure 2B:
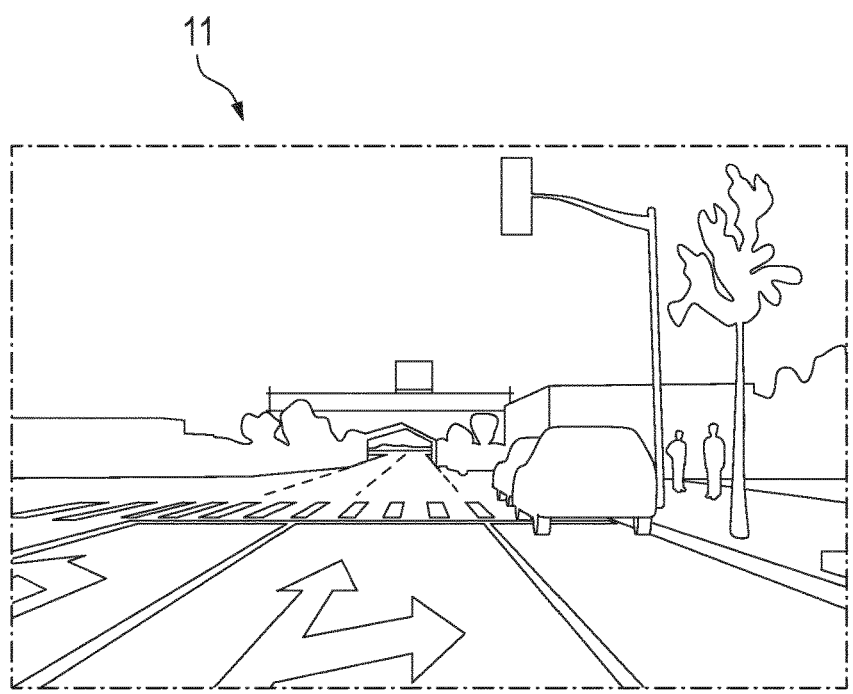
FIG. 2b shows a schematic representation to illustrate a method for producing an evaluation result with reduced first resolution, according to some aspects of the present disclosure.

FIG. 2*a* shows a schematic representation to illustrate the method. Shown are captured sensor data 10 in the form of a camera image. FIG. 2*b* shows a semantic segmentation as an evaluation result 11, in which an object class (indicated as different hatchings) is assigned to each picture element of the camera image. For this purpose, the sensor data 10 shown in FIG. 2*a*, that is, the camera image, were used in a first resolution, which is lower compared to the original resolution, that is, the camera image was down-sampled in the resolution thereof. A child 30 standing at the end of the row of vehicles visible in the camera image on the right is not captured by the semantic segmentation due to the reduced resolution, and therefore does not appear in the evaluation result 11.

Figure 3A:
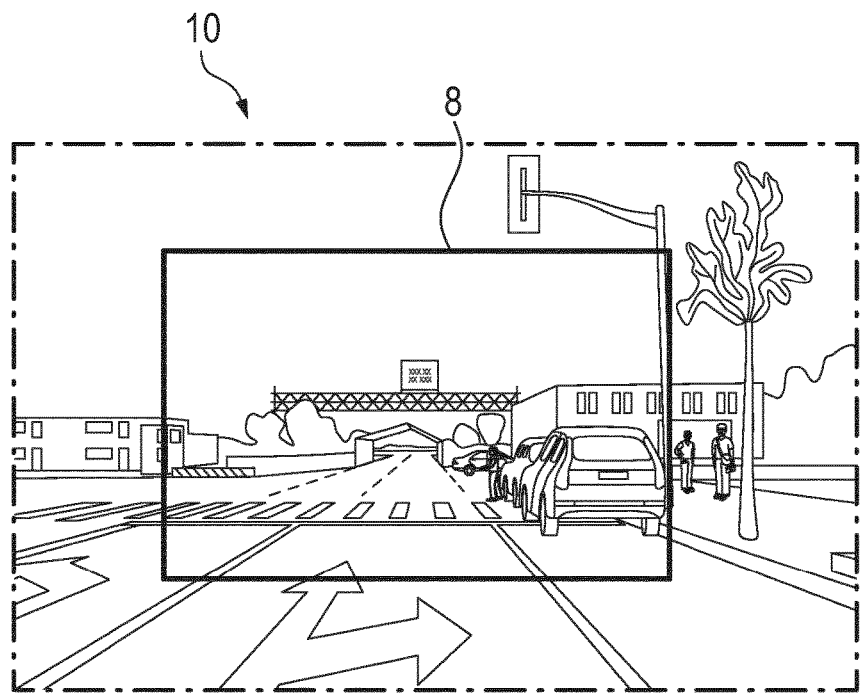
FIG. 3a shows a schematic representation illustrating a method according to some aspects of the present disclosure.
Figure 3B:
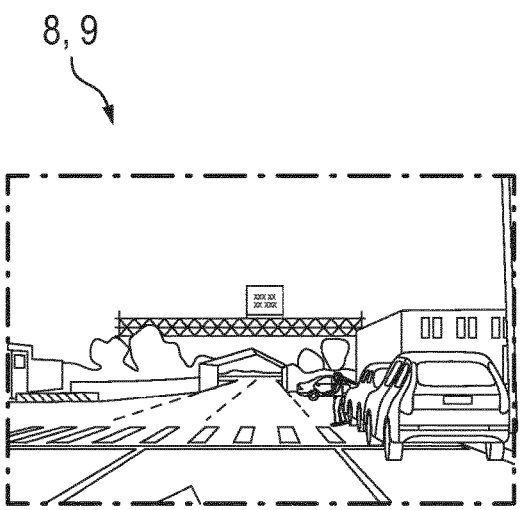
FIG. 3b shows a schematic representation of a section of sensor data belonging to a defined focus region according to some aspects of the present disclosure.
Figure 3C:
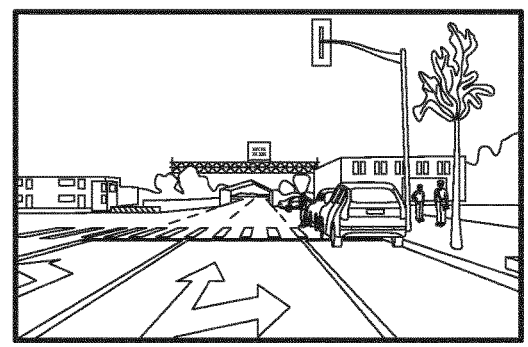
FIG. 3c shows a schematic representation of resolution-reduced sensor data according to some aspects of the present disclosure.

FIG. 3*a* shows a procedure according to the method described in the present disclosure. A focus region 8 is defined in the captured sensor data 10, that is, in the camera image. A simple case is shown, in which the focus region 8 encompasses the center of the road situated ahead. A section 9 corresponding to the focus region 8 (FIG. 3*b*) is evaluated in a second resolution, which corresponds to the original resolution of the sensor data 10. The complete sensor data 10, that is, the complete camera image, are down-sampled to a lower first resolution to resolution-reduced sensor data 10—(FIG. 3*c*).

After the focus region 8 has been cut out and the sensor data 10 have been down-sampled, the focus region 8 and the resolution-reduced sensor data 10—are each evaluated by the evaluation method, which, by way of example, again encompasses a semantic segmentation during which an object class is in each case assigned to the individual picture elements.

Figure 4:
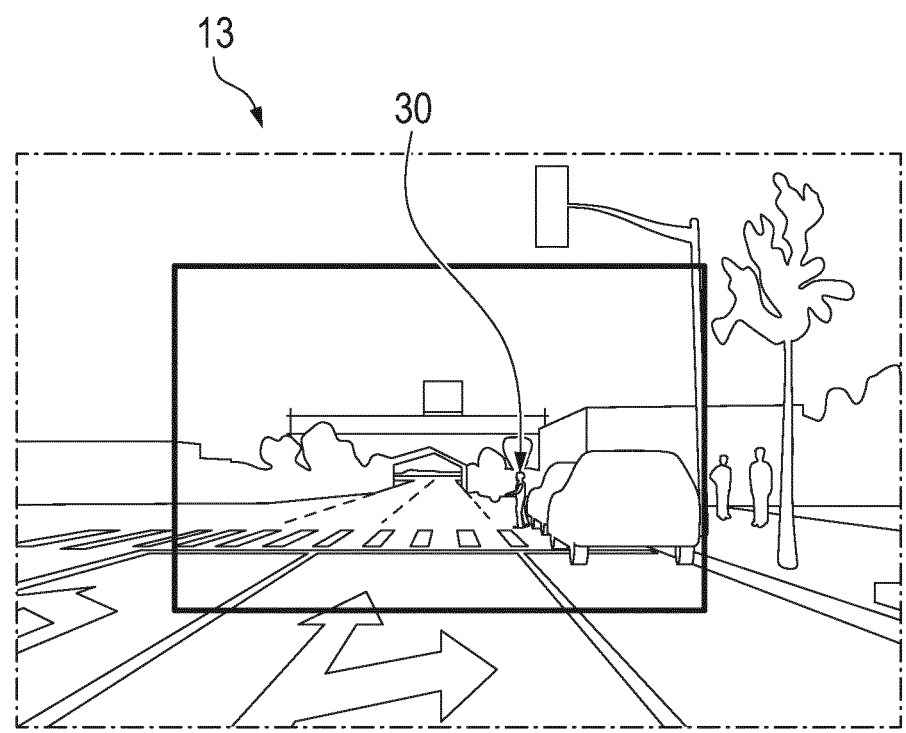
FIG. 4 shows a schematic representation illustrating an overall result combined from the evaluation results according to some aspects of the present disclosure.

The resulting evaluation results are combined to an overall result 13 again. FIG. 4 shows a schematic representation of the combined overall result 13.

It is clearly apparent in the overall result 13 that picture elements associated with the child 30 are correctly classified, and the object type "person" or "child" was assigned to these picture elements, since it was possible to select a higher resolution in this area than in the remaining areas by way of the definition of a focus region 8. The semantic segmentation in this way captured or recognized the child 30 in the captured sensor data 10.

It is thus possible, by means of the method described in the present disclosure and the device 1 described in the present disclosure, to find a compromise between a necessary computing power and an accuracy during the evaluation of sensor data 10.

For the sake of clarity, only one focus region 8 was defined and shown in the examples described above. In principle, further focus regions can be defined. The procedure is analogous in each case.

LIST OF REFERENCE NUMERALS 1 device
2 evaluation unit
3 resolution reduction module
4 cut-out module
5 first neural network
6 second neural network
7 combining module
8 focus region
9 section
10 captured sensor data
10—resolution-reduced sensor data
11 evaluation result
12 evaluation result
13 overall result
14 change detection module
15 movement detection module
16 further neural network
17 priority
18 rule-based system
19 logic module
30 child
50 vehicle
51 sensor
52 maneuver planner
53 position
54 planned trajectory

The invention claimed is:

1. A method for sensing an environment of a vehicle configured to drive in an at least semi-automated manner, comprising:
    capturing an environment of the vehicle via at least one sensor to produce environment sensor data;
    evaluating the environment sensor data via an evaluation unit using a first neural network at a first lower resolution to perform an environment sensing function; and
    defining one or more focus regions in the environment sensor data;
    evaluating the environment sensor data in the one or more defined focus regions via the evaluation unit using a second neural network, distinct from the first neural network, at a second higher resolution to perform the environment sensing function; and
    combining the evaluated environment sensor data of the first lower resolution evaluation and the second higher resolution evaluation, wherein uncertainties of the first lower resolution evaluation and the second higher resolution evaluation are estimated and weighted during the combining to form an overall evaluation result, configured to affect a function of the vehicle.

2. The method according to claim 1, wherein defining the one or more focus regions comprises defining the one or more focus regions via a rule-based system as a function of at least one of (i) a position of the vehicle, (ii) a planned trajectory of the vehicle, and/or (iii) an environment context.

3. The method according to claim 1, wherein defining the one or more focus regions comprises defining the one or more focus regions as a function of detected temporal changes in the captured sensor data.

4. The method according to claim 1, wherein defining the one or more focus regions comprises defining the one or more focus regions as a function of at least one detected movement in the captured sensor data.

5. The method according to claim 1, wherein defining the one or more focus regions comprises defining the one or more focus regions via machine learning.

6. The method according to claim 1, further comprising estimating an uncertainty of the first lower resolution evaluation and the second higher resolution evaluation during the combining of the evaluated environment sensor data.

7. The method according to claim 1, further comprising assigning a priority to each of the one or more focus regions, and evaluating the environment sensor data in the one or more defined focus regions based on the assigned priority.

8. The method according to claim 1, wherein evaluating the environment sensor data in the one or more defined focus regions via the evaluation unit using a second higher resolution comprises maintaining the evaluated environment sensor data in the one or more defined focus regions for a configured duration after the one or more defined focus regions is abandoned.

9. An apparatus for sensing an environment of a vehicle configured to drive in an at least semi-automated manner, comprising:
    at least one sensor configured to capture an environment of the vehicle to produce environment sensor data;
    an evaluation unit, operatively coupled to the at least one sensor, wherein the evaluation unit is configured to
        evaluate the environment sensor data using a first neural network at a first lower resolution to perform an environment sensing function; and
        define one or more focus regions in the environment sensor data;
        evaluate the environment sensor data in the one or more defined focus regions using a second neural network, distinct from the first neural network, at a second higher resolution to perform the environment sensing function; and
        combine the evaluated environment sensor data of the first lower resolution evaluation and the second higher resolution evaluation, wherein uncertainties of the first lower resolution evaluation and the second higher resolution evaluation are estimated and weighted during the combining to form an overall evaluation result, configured to affect a function of the vehicle.

10. The apparatus according to claim 9, wherein the evaluation unit is configured to define the one or more focus regions by defining the one or more focus regions via a rule-based system as a function of at least one of (i) a position of the vehicle, (ii) a planned trajectory of the vehicle, and/or (iii) an environment context.

11. The apparatus according to claim 9, wherein the evaluation unit is configured to define the one or more focus regions by defining the one or more focus regions as a function of detected temporal changes in the captured sensor data.

12. The apparatus according to claim 9, wherein the evaluation unit is configured to define the one or more focus regions by defining the one or more focus regions as a function of at least one detected movement in the captured sensor data.

13. The apparatus according to claim 9, wherein the evaluation unit is configured to define the one or more focus regions by defining the one or more focus regions via machine learning.

14. The apparatus according to claim 9, wherein the evaluation unit is configured to estimate an uncertainty of the first lower resolution evaluation and the second higher resolution evaluation during the combining of the evaluated environment sensor data.

15. The apparatus according to claim 9, wherein the evaluation unit is configured to assign a priority to each of the one or more focus regions, and evaluate the environment sensor data in the one or more defined focus regions based on the assigned priority.

16. The apparatus according to claim 9, wherein the evaluation unit is configured to evaluate the environment sensor data in the one or more defined focus regions using a second higher resolution by maintaining the evaluated environment sensor data in the one or more defined focus regions for a configured duration, after the one or more defined focus regions is abandoned.

17. A method for sensing an environment of a vehicle configured to drive in an at least semi-automated manner, comprising:

capturing an environment of the vehicle via at least one sensor to produce environment sensor data;

evaluating the environment sensor data via an evaluation unit using a first neural network at a first lower resolution to perform an environment sensing function; and defining one or more focus regions in the environment sensor data via machine learning;

evaluating the environment sensor data in the one or more defined focus regions via the evaluation unit using a second neural network, distinct from the first neural network, at a second higher resolution to perform the environment sensing function; and combining the evaluated environment sensor data of the first lower resolution evaluation and the second higher resolution evaluation, wherein uncertainties of the first lower resolution evaluation and the second higher resolution evaluation are estimated and weighted during the combining to form an overall evaluation result, configured to affect a function of the vehicle.

18. The method according to claim 17, wherein defining the one or more focus regions comprises defining the one or more focus regions via a rule-based system as a function of at least one of (i) a position of the vehicle, (ii) a planned trajectory of the vehicle, and/or (iii) an environment context.

19. The method according to claim 17, wherein defining the one or more focus regions comprises defining the one or more focus regions as a function of detected temporal changes in the captured sensor data.

20. The method according to claim 17, wherein defining the one or more focus regions comprises defining the one or more focus regions as a function of at least one detected movement in the captured sensor data.

* * * * *